United States Patent
Matalon et al.

(10) Patent No.: US 9,709,189 B2
(45) Date of Patent: Jul. 18, 2017

(54) FINAL POSITION LOCKING FEATURE OF MULTI-TURN ROTATIONAL DEVICE HAVING AN AXIALLY TRANSLATING WHEEL OR A CLOCKED LOCK PASSAGE GEAR

(71) Applicant: ITT MANUFACTURING ENTERPRISES LLC., Wilmington, DE (US)

(72) Inventors: Louis E. Matalon, Lancaster, PA (US); Steven Haun, Landisville, PA (US); Michael D. Yoder, Quarryville, PA (US)

(73) Assignee: ITT MANUFACTURING ENTERPRISES LLC, Wilmington, DE (US)

( * ) Notice: Subject to any disclaimer, the term of this patent is extended or adjusted under 35 U.S.C. 154(b) by 5 days.

(21) Appl. No.: 14/193,349

(22) Filed: Feb. 28, 2014

(65) Prior Publication Data
US 2015/0247588 A1 Sep. 3, 2015

(51) Int. Cl.
*F16K 35/02* (2006.01)
*F16K 37/00* (2006.01)

(52) U.S. Cl.
CPC ........ *F16K 37/0008* (2013.01); *F16K 35/025* (2013.01); *F16K 35/027* (2013.01); *Y10T 137/8275* (2015.04)

(58) Field of Classification Search
CPC ... F16K 37/0008; F16K 35/027; F16K 35/025
(Continued)

(56) References Cited

U.S. PATENT DOCUMENTS 1,341,151 A * 5/1920 Olson ........................... 137/383
2,656,145 A * 10/1953 Lawson .................. B60T 7/124
137/203
(Continued)

FOREIGN PATENT DOCUMENTS

CN 203176523 9/2013
CN 203395355 1/2014
(Continued)

OTHER PUBLICATIONS

KR20130003875 English Language Abstract (1 page).
(Continued)

*Primary Examiner* — Jessica Cahill
*Assistant Examiner* — Daphne M Barry
(74) *Attorney, Agent, or Firm* — Ware, Fressola, Maguire & Barber LLP

(57) ABSTRACT

A valve, including a diaphragm valve, is provided featuring a cover in combination with at least one inner housing component. The cover may be configured with a biased-pin mounted therein. The at least one inner housing component may be configured with a hole or slot formed at a predetermined location where the biased-pin is at when the valve is calibrated to be at a final position. The cover may be configured to rotate and cause an axial translation between the cover and the at least one inner housing component so that the biased-pin engages the hole or slot when the valve is at the final position so as to stop any further axial and rotational movement.

16 Claims, 7 Drawing Sheets

(58) Field of Classification Search
USPC ..... 251/93, 96, 99, 100–102, 104, 105, 110, 251/111, 112; 70/175–179, 229–232, 70/190, 191
See application file for complete search history.

(56) References Cited

U.S. PATENT DOCUMENTS

| | | | | |
|---|---|---|---|---|
| 3,384,339 A | * | 5/1968 | Cornell, III | F16K 31/60 137/382 |
| 3,505,888 A | * | 4/1970 | Denkowski | F16H 25/2018 192/38 |
| 5,295,660 A | * | 3/1994 | Honma | F16K 35/00 251/288 |
| 5,950,462 A | * | 9/1999 | Neeley | E05B 13/001 70/175 |
| 6,196,523 B1 | * | 3/2001 | Miyata | F16K 1/302 251/264 |
| 6,446,666 B1 | * | 9/2002 | Wadsworth | F16K 35/06 137/552 |
| 7,059,584 B2 | * | 6/2006 | Balasubramanian | F16K 7/126 251/264 |
| 9,016,307 B2 | * | 4/2015 | Matalon | F16K 7/126 137/315.05 |
| 2002/0063230 A1 | * | 5/2002 | Cavagna | F16K 35/00 251/284 |

FOREIGN PATENT DOCUMENTS

| | | |
|---|---|---|
| EP | 1001203 | 5/2000 |
| JP | H1151216 | 2/1999 |
| KR | 20130003875 | 1/2013 |

OTHER PUBLICATIONS

CN203395355 English Language Abstract (1 page).
CN203176523 English Language Abstract (1 page).
EP1001203 English Language Abstract (1 page).
JPH1151216 English Language Abstract (1 page).

* cited by examiner

FINAL POSITION LOCKING FEATURE OF MULTI-TURN ROTATIONAL DEVICE HAVING AN AXIALLY TRANSLATING WHEEL OR A CLOCKED LOCK PASSAGE GEAR

BACKGROUND OF THE INVENTION

1. Field of the Invention

The present invention relates to a diaphragm valve; and more particularly relates to a weir-type diaphragm valve.

2. Brief Description of Related Art

FIG. 1 shows an example of a typical locking mechanism for a rotating system in the form of a spring-pin ratchet. In this example, the spring-pin ratchet has a rotating cover which moves along an axis of rotation, however, an axial translation is not required for the spring-pin ratchet mechanism to work. In FIG. 1A, the spring-pin ratchet has a spring-pin 1 fully engaged into a trough between teeth that form part of the ratcheting mechanism. Note that although the spring-pin 1 appears to be seated, the cover 2 has not been tightened. During the rotation, the spring-pin 1 rides over individual teeth, as shown in FIG. 1B. When fully tightened, the spring-pin 1 is flush; however the passive visual indication 3 for this system is the covering of the decal by the axial motion of the cover 2, as depicted in FIG. 1C. The ratcheting mechanism prevents unloading of the system until the pin 1 is pulled.

One disadvantage of the prior art technique shown in FIG. 1 is that there is not a conclusive indication that a final position of a multi-turn mechanism has been achieved when using a simple spring-pin ratchet mechanism. In the case of a diaphragm valve, customers demand a positive indication for both product and employee safety.

SUMMARY OF THE INVENTION

According to some embodiments, the present invention may take the form of apparatus, e.g., in the form of a valve, including a diaphragm valve, featuring a cover in combination with at least one inner housing component. The cover may be configured with a biased-pin mounted therein. The at least one inner housing component may be configured with a hole or slot formed at a predetermined location where the biased-pin is at when the valve is calibrated to be at a final position. The cover may be configured to rotate and cause an axial translation between the cover and the at least one inner housing component so that the biased-pin engages the hole or slot when the valve is at the final position so as to stop any further axial and rotational movement.

Embodiments of the present invention may also include one or more of the following features:

The at least one inner housing component may include a circumferential surface configured with the hole or slot formed therein to receive the biased-pin.

The cover may be configured to rotate and move along the axis of translation in relation to the at least one inner housing component.

The biased-pin may be configured to bypass the hole or slot when the cover has not yet moved far enough along the axis of translation.

The biased-pin may include a head portion and an end portion; and the head portion may be configured to visually indicate when the valve is at the final position, and the end portion is fully engaged in hole or slot of the at least one inner housing component, and the head portion is flush with an outer surface of the cover.

The cover may include a rotating component configured with threads; the at least one inner housing component may include a stem portion configured with corresponding threads; and the threads and the corresponding threads may be configured to cooperate and cause the axial translation between the cover and the at least one inner housing component when the cover is rotated.

The at least one inner housing component may include a threaded locking gear configured with a threaded surface having at least part of the hole or slot formed therein so as to form a gear cutout.

The at least one inner housing component may include threaded gears and a central gear configured to respond to the rotational movement of the rotating cover and rotate the threaded gears so as to cause the axial translation between the cover and the at least one inner housing component.

Each threaded gear may be configured with threads; the central gear may be configured with corresponding threads; and the threads and the corresponding threads may be configured to cooperate and cause the axial translation between the cover and the at least one inner housing component when the cover is rotated.

Each threaded gear may be configured to translate down in response to the rotational movement of the cover.

The threaded locking gear may be configured to rotate and spin in response to the rotational movement of the cover and the downward translation of the threaded gears of the at least inner housing component.

The at least one inner housing component may include a circumferential surface; and the biased-pin may include an end portion and be mounted in the cover so that part of the end portion rests against a corresponding part of some combination of the circumferential surface, or the threaded surface of the threaded locking gear, or both, until the valve is at the final position and at least part of the end portion drops into the gear cutout.

The circumferential surface may include a corresponding cut or slot configured to receive at least part of the end portion of the biased-pin when the valve is at the final position The threaded locking gear may be configured with a different number of teeth or diameter than the center gear in order for the threaded locking gear to have a unique rotational position with each rotation, calibrating for alignment of the gear cutout and spring-pin in the final position The threaded locking gear may include an outer surface configured with associated threads and may be configured with an unthreaded central bore hole; the at least one inner housing component may include a pivot portion configured to receive the unthreaded central bore hole of the threaded locking gear; and the associated threads of the threaded locking gear and the corresponding threads of the central gear may be configured to cooperate and cause the threaded locking gear to rotate when the cover is rotated.

The biased-pin may include, or take the form of, a spring-pin having a combination of a pin and biasing member configured to urge the spring-pin inwardly towards the at least one inner component.

The biased-pin may be configured to be pulled outwardly to disengage the hole or slot in the inner housing component so as to allow further rotational movement, including forward and reverse rotational movement.

The inner housing component may include a circumferential surface having ratchet teeth configured to cooperate with the biased-pin so that the rotational movement is locked at incremental forward rotational positions and prevented from reverse rotational movement.

The cover may be configured to rotate in an axis of rotation that is substantially parallel to the axis of translation.

The scope of the invention is intended to include, and embodiments are envisioned in which, pulleys can be substituted for gears. Clockwise and counter-clockwise functions could also be switched.

One advantage of the present invention is that it provides a conclusive indication that the multi-turn mechanism is fully engaged, e.g., by the spring-pin dropping to a fully engaged position. This prevents any further rotation in either direction until the spring-pin is pulled.

Another advantage of the present invention is that it provides simple mechanical solutions to a requirement that may otherwise be solved with more expensive and complex electronic solutions. For example, alternatively, certainly electronic systems of varying degrees of complexity could be employed to achieve this task. By way of example, the simplest may take the form of a visual indication triggered by a proximity switch. Even the simplest arrangement is likely too costly and requires electrical power, making the mechanical solutions according to the present invention set forth herein more attractive, especially when electrical power may not be readily available for any particular application, e.g., of such a valve. Moreover, electronic solutions such as proximity switches are typically cost prohibitive.

BRIEF DESCRIPTION OF THE DRAWING

The drawing includes the following Figures, not necessarily drawn to scale:

FIG. 10 shows the spring-pin ratcheting mechanism in a final position with the cover tightened and the spring-pin fully engaged.

FIG. 2 includes FIGS. 2A to 2C having ¾ sectional cover views and shows an axially translating ratcheting mechanism, according to some embodiments of the present invention, where

FIG. 3 includes FIGS. 3A to 3C having ¾ sectional cover views and shows a clocked lock passage gear mechanism, according to some embodiments of the present invention, where

Figure 1A:
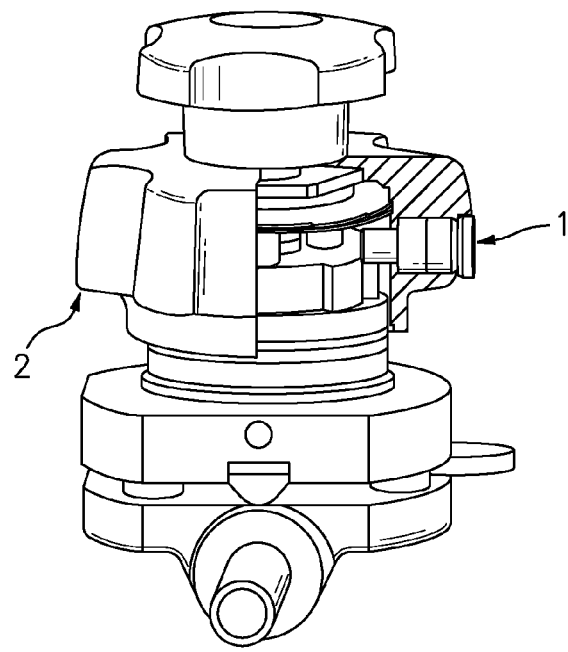
FIG. 1A shows the spring-pin ratcheting mechanism in an initial position with a cover unthreaded and a spring-pin fully engaged; where
Figure 1B:
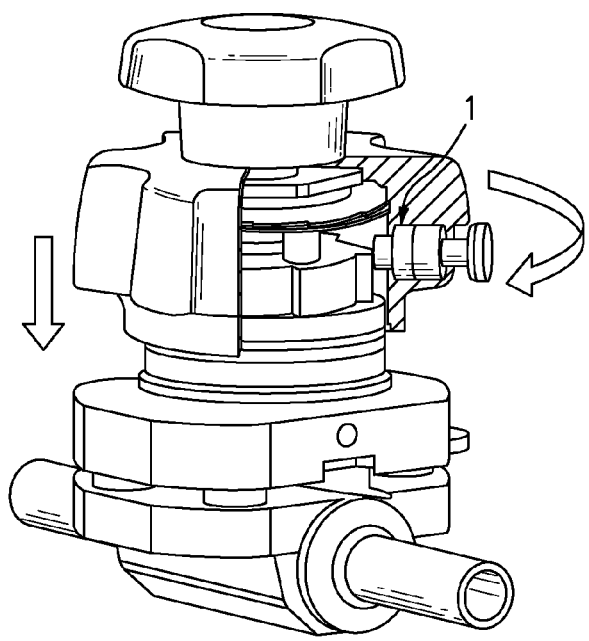
FIG. 1B shows the spring-pin ratcheting mechanism in a ratcheting position with the cover transitioning downwardly and the spring-pin sliding over saw teeth; and where
Figure 1C:
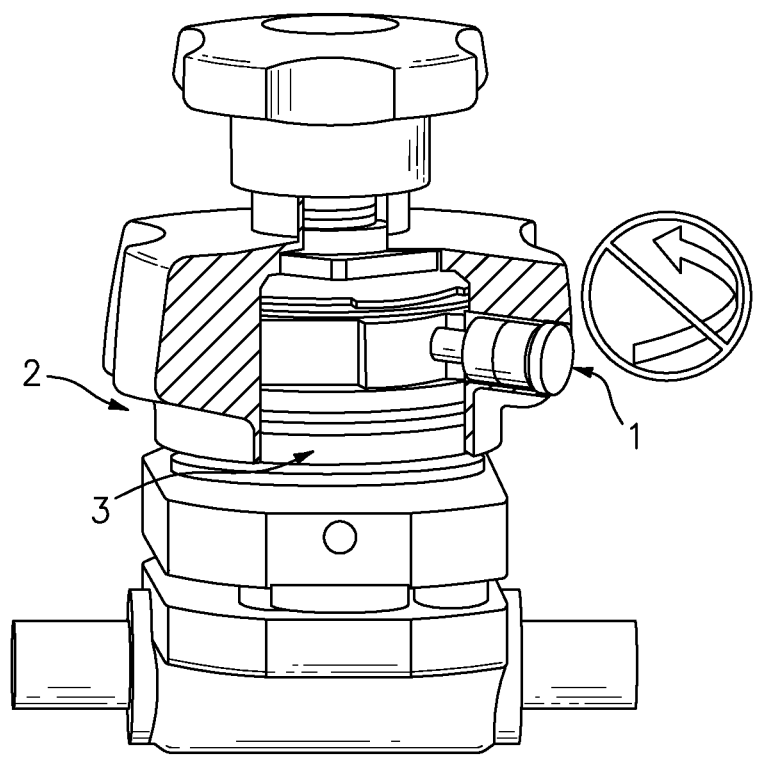
FIG. 1 includes FIGS. 1A to 1C having ¾ sectional cover views and shows a typical spring-pin ratcheting mechanism that is known in the prior art, where

In the following description of the exemplary embodiment, reference is made to the accompanying Figures in the drawing, which form a part hereof, and in which are shown by way of illustration of an embodiment in which the invention may be practiced. It is to be understood that other embodiments may be utilized, as structural and operational changes may be made without departing from the scope of the present invention.

DETAILED DESCRIPTION OF THE INVENTION

FIGS. 2 and 3 show the present invention in the form of apparatus generally indicated as 10, 10'. By way of example, the apparatus 10, 10' is shown in the form of a valve also indicated 10, including a diaphragm valve, featuring a cover 12 in combination with at least one inner housing component generally indicated as 20, 20'.

The cover 12 may be configured with a biased-pin 14 generally indicated as mounted therein. In particular, the biased-pin 14 may include, or take the form of a spring-pin, e.g., having a combination of a pin 14a, a biasing member 14b, a head 14c and an end portion 14d. The biasing member 14b may be configured to urge the pin 14a inwardly towards the at least one inner component 20, 20'. The biasing member 14b may include, or take the form of, a spring or elastomeric material configured to be resilient and move by elastic force. The biased-pin 14 shown in FIGS. 2-3 is shown by way of example, and the scope of the invention is intended to include other types or kinds of biased-pin arrangements either now known or later developed in the future within the spirit of the underlying invention.

The at least one inner housing component 20 may be configured with a hole or slot 22, 22', 22" formed therein at a predetermined location L where the biased-pin 12 is at when the valve 10, 10' is calibrated to be at a final position. In operation, the cover 12 may be configured to rotate and cause an axial translation along an axis A between the cover 12 and the at least one inner housing component 20, 20' so that the biased-pin 14 engages the hole or slot 22, 22', 22" when the valve 10 is at the final position so as to stop any further axial and/or rotational movement. By way of example, the calibration of the final position may form part of a design, manufacturing or assembly process related to the valve, and the at least one inner housing component 20 may be configured with the hole or slot 22, 22', 22" formed therein, based at least partly on such a calibration. The scope of the invention is not intended to be limited to any particular type or kind of calibration technique, e.g., for determining the location of the final position and/or the predetermined location L where the hole or slot 22, 22', 22" may be formed or configured.

The biased-pin 14 may be configured to be pulled outwardly to disengage the hole or slot 22, 22', 22" in the inner housing component 20, 20' so as to allow further rotational movement, including forward and reverse rotational movement, e.g., in order to disassemble the valve, e.g. for maintenance and/or replacement.

In FIGS. 2-3, the valve 10, 10' is shown having other components, e.g., including a handle 11, a valve body 30, a housing 32 that includes the at least one inner housing component 20, 20', associated piping or ports 34a, 34b for providing a process flow to and from the valve 10, as well as other parts and components that do not form part of the underlying invention and are not described herein in detail. By way of example, the reader is referred to that disclosed in patent application Ser. No. 13/554,532, filed 20 Jul. 2012, patent application Ser. No. 13/554,535, filed 20 Jul. 2012, as well as patent application Ser. No. 13/544,541, filed 20 Jul. 2012, which are all assigned to the assignee of the present invention, which disclose the functionality of one or more such other parts and components, and which are all incorporated by reference in their entirety.

It is important to note that, while the present invention is shown and described in relation to an implementation in a valve, the scope of the invention is intended to include the present invention being implemented in other types or kinds of apparatus or multiple rotational devices needing a final turn lock, consistent with that disclosed herein.

Similar parts in FIGS. 2 and 3 will be numbered with similar reference numerals. For the sake of not cluttering the Figures, not every part in every Figure will be numbered with a reference numeral.

FIG. 2: The Axially Translating Ratchet Mechanism

Figure 2A:
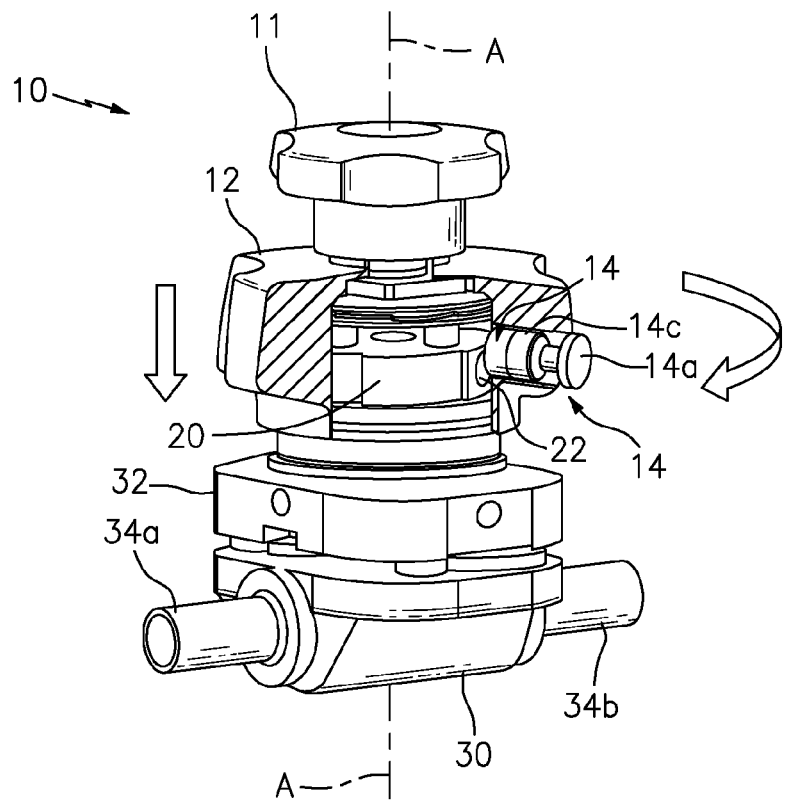
FIG. 2A shows the axially translating ratcheting mechanism in a ratcheting position with the cover transitioning downwardly and the spring-pin sliding over a locking hole formed at a final position; where
Figure 2B:
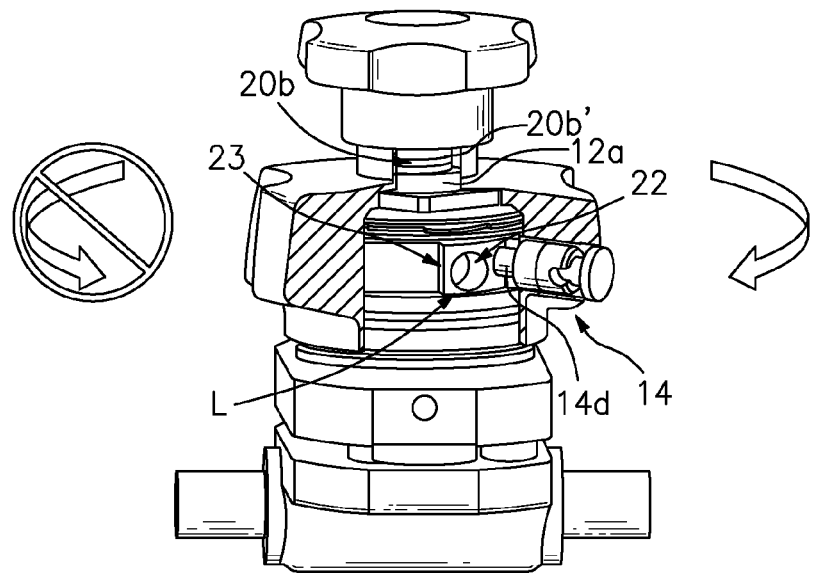
FIG. 2B shows the axially translating ratcheting mechanism approaching the final position; and where
Figure 2C:
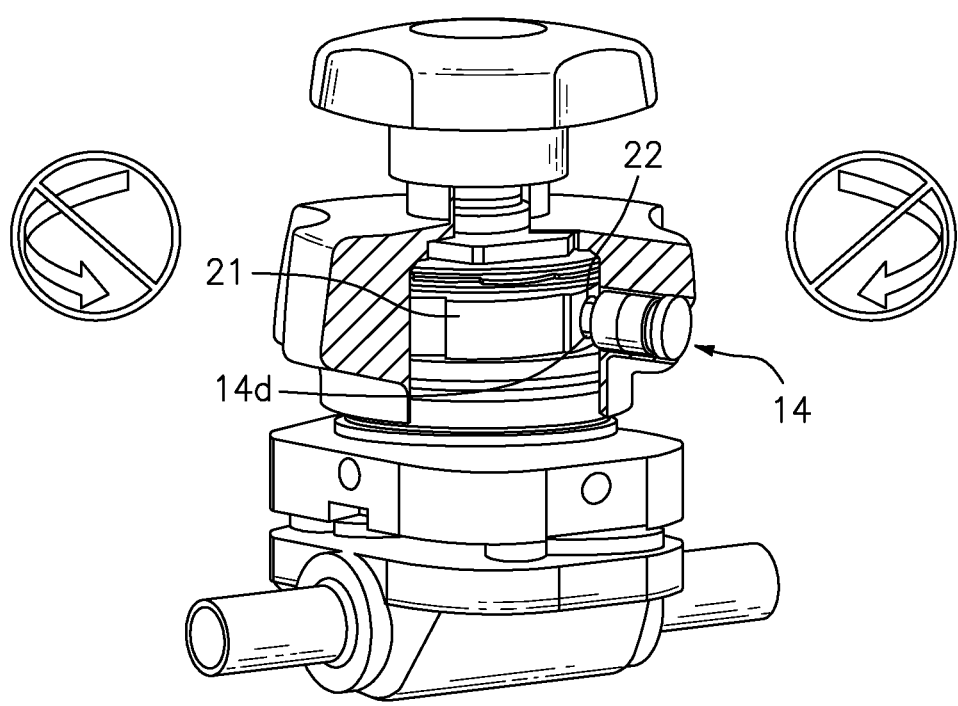
FIG. 2C shows the axially translating ratcheting mechanism in the final position with the cover tightened and the spring-pin fully engaged in the locking hole.

In particular, FIG. 2 shows the present invention according to some embodiments, for a system where the rotating component or cover 12 moves or translates along the axis A in relation to the at least one inner housing component 20, and the spring pin 14 can drop into the hole 22 located where the spring-pin 14 is at when the device or valve 10 is calibrated to be at the final position. Consistent with that shown in FIGS. 2A to 2C, for example, the at least one inner housing component 20 may include a circumferential surface 21 (FIG. 2C) configured with the hole or slot 22 formed therein to receive the biased-pin 14.

FIGS. 2A and 2B show the spring-pin 14 axially positioned too high to engage the locking hole 22, thus bypassing the hole 22 when the cover 12 has not yet moved far enough downwardly in the axial direction along the axis A. FIG. 2C shows when the spring-pin engages the hole 22, and all rotation is locked until the spring-pin 14 is pulled outwardly. The spring-pin 14 also visually indicates this status, as it is the only position where the spring-pin 14 is fully engaged and the head 14c of the pin 14 may be configured and designed to be flush with the housing or outer surface of the cover 12, consistent with that shown in FIG. 2C.

In FIG. 2, the cover 12 may be configured to rotate and move along the axis of translation along the axis A in relation to the at least one inner housing component 20. The cover 12 may include a rotating component 12a (FIG. 2B) configured with inner threads (not shown); the at least one inner housing component 20 may include a stem portion generally indicated as 20b configured with corresponding outer threads 20b'; and the inner threads and the corresponding outer threads 20b' may be configured to cooperate and cause the axial translation along the axis A between the cover 12 and the at least one inner housing component 20 when the cover 12 is rotated. Consistent with that shown, the cover 12 and the rotating component 12a are configured together so that when the cover 12 is rotated, the rotating component 12a also rotates in a corresponding manner.

Although not required, and thus being optional, according to some embodiments of the present invention, it is possible to incorporate a ratchet mechanism so that the rotation is locked from reversing at all incremental positions, e.g., as shown in FIG. 2B. Consistent with that shown in FIG. 2, the circumferential surface 21 may also be configured with optional ramps and saw teeth generally indicated as 23 configured to prevent loosening of the cover 12 at incremental rotational positions. As shown in FIG. 2B, the pin 14 is partially engaged when in between shallow teeth 23.

The axially translation technique can also use a visual indication to further ensure the customer that the valve mechanism is fully engaged.

FIG. 3: Clocked Lock Passage Gear Mechanism

In particular, FIG. 3 shows the present invention according to some embodiments, for a system where the rotating wheel, component or cover 12 does not translate along the axis A with rotational motion. Instead, the at least one inner housing component 20' is configured to move and translate along the axis A in response to the rotation of the cover 12.

Consistent with that shown in FIG. 3, and by way of example, the at least one inner housing component 20' may include a threaded locking gear 24 configured with an outer threaded surface 24a having the hole or slot 22' (see FIGS. 3E and 3F) formed therein so as to form a so-called gear cutout, that is configured to receive at least part of the end portion 14d of the spring-pin 14 when the valve 10' is at the final position. In addition, as best shown in FIGS. 3E and 3F, the at least one inner housing component 20' may include a circumferential surface 21' having a corresponding cut or slot indicated as 22" configured to receive at least part of the end portion 14d of the spring-pin 14 when the valve 10' is at the final position. The gear cutout 22' and the corresponding cut or slot 22" combined to form a combined gear cutout, hole or slot 22', 22", according to some embodiments of the present invention.

In operation, the spring pin 14 is blocked by the threaded locking near 24 from engaging the combined gear cutout, hole or slot 22', 22", consistent with that shown in FIGS. 3A to 3D. At the final, fully loaded position, the spring pin 14 engages the combined gear cutout, hole or slot 22', 22" and prevents further forward or reverse rotation, consistent with that shown in FIGS. 3E and 3F.

Consistent with that shown in FIGS. 3A to 3D, in operation, the end portion 14d of the biased-pin 14 may be mounted in the cover 12 so that part of the end portion 14d rests against some combination of the circumferential surface 21', or the outer threaded surface 24a of the threaded locking gear 24, or both, until the valve 10' is at the final position and at least part of the end portion 14d drops into the combined gear cutout, hole or slot 22', 22".

The at least one inner housing component 20' may also include threaded gears 26 and a central gear 28 configured to respond to the rotational movement of the rotating cover 12 and rotate the threaded gears 26 so as to cause the axial translation along the axis A between the cover 12 and the at least one inner housing component 20'. By way of example, each threaded gear 26 may be configured with threads 26a; the central gear 28 may be configured with corresponding threads 28a; and the threads 26a and the corresponding threads 28a may be configured to cooperate and cause the axial translation along the axis A between the cover 12 and the at least one inner housing component 20' when the cover 12 is rotated. In operation, each threaded gear 26 may be configured to translate down in response to the rotational movement of the cover 12.

Moreover, the threaded locking gear 24 may also be configured to rotate and spin in response to the axial movement and downward translation of the threaded gears 26 and the inner housing component 20'. For example, the threaded locking gear 24 may be configured with the outer threaded surface 24a and an unthreaded central bore hole 24b; the at least one inner housing component 20' may include a pivot portion 20'a configured to receive the unthreaded central bore hole 24b of the threaded locking gear 24; and the threaded surface 24a of the threaded locking gear 24 and the corresponding threads 28a of the central gear 28 may be configured to cooperate and cause the threaded locking gear 24 to rotate and spin when the cover 12 is rotated.

Figure 3A:
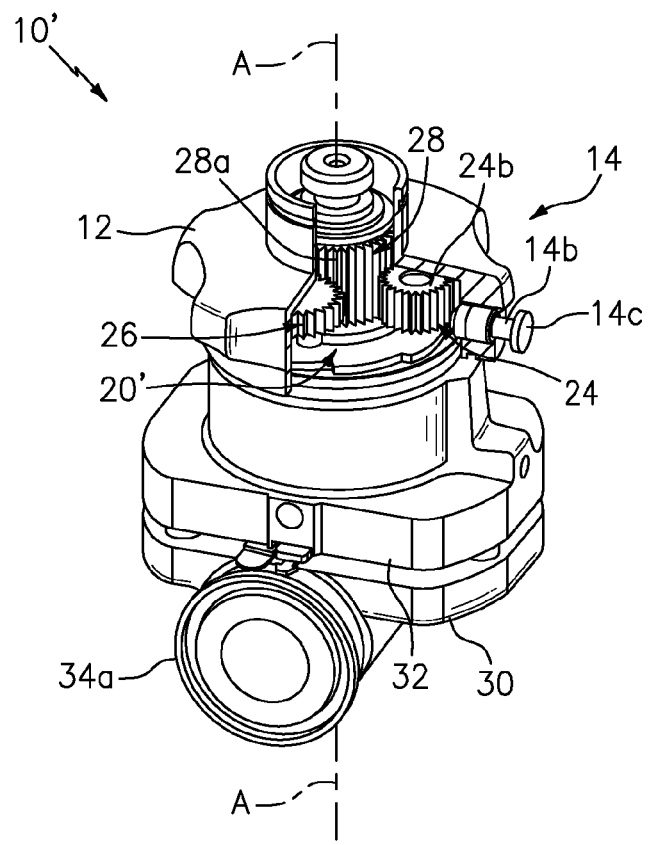
FIG. 3A shows the clocked lock passage gear mechanism in an initial position with the spring-pin blocked by a clock gear; where
Figure 3B:
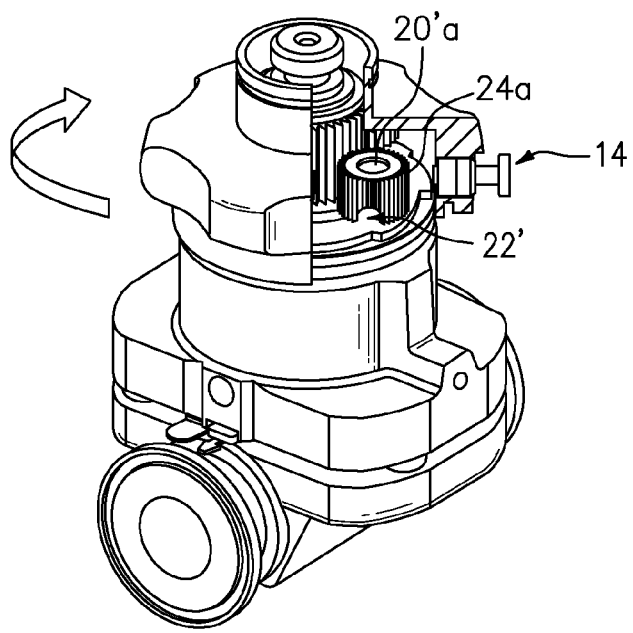
FIG. 3B shows the clocked lock passage gear mechanism in a ratcheting position with gears transitioning downwardly and a spring-pin sliding over saw teeth; where
Figure 3C:
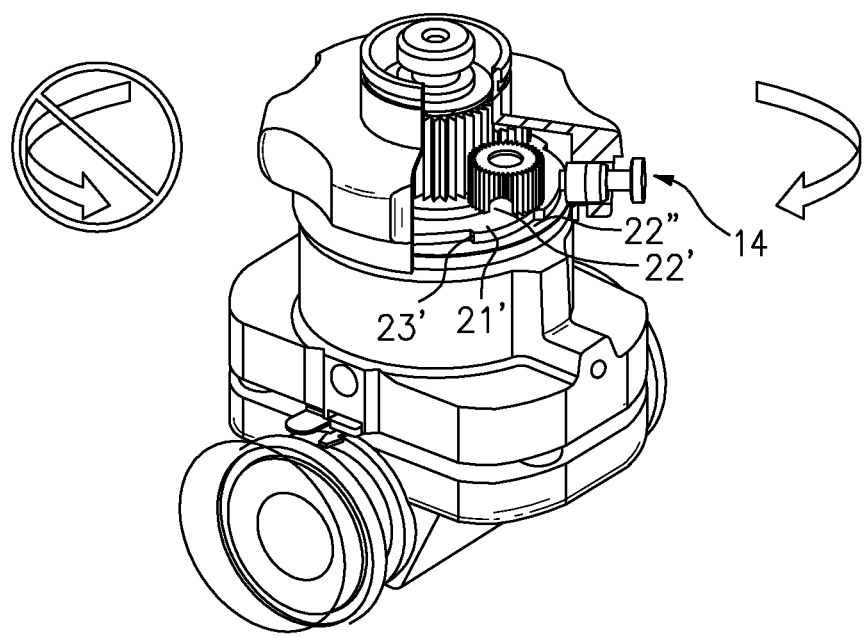
FIG. 3C shows the clocked lock passage gear mechanism in another ratcheting position with the gears continuing to transition downwardly and the spring-pin incrementally locking the saw teeth; where
Figure 3D:
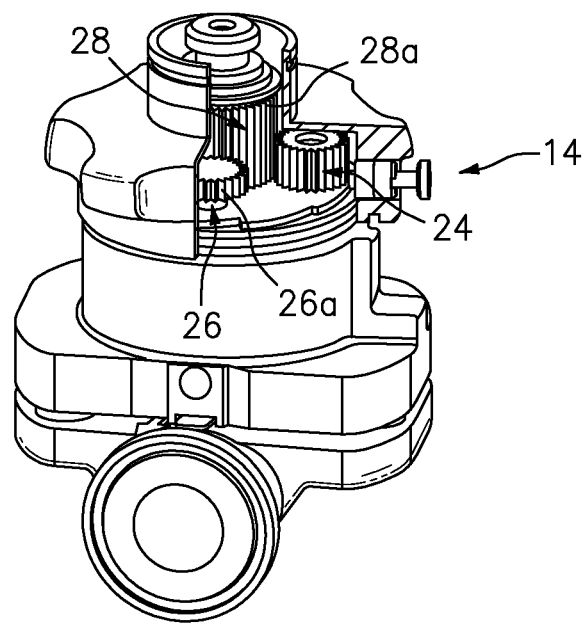
FIG. 3D shows the clocked lock passage gear mechanism in still another ratcheting position with the gears continuing to transition downwardly and the spring-pin sliding over a locking gear; where
Figure 3E:
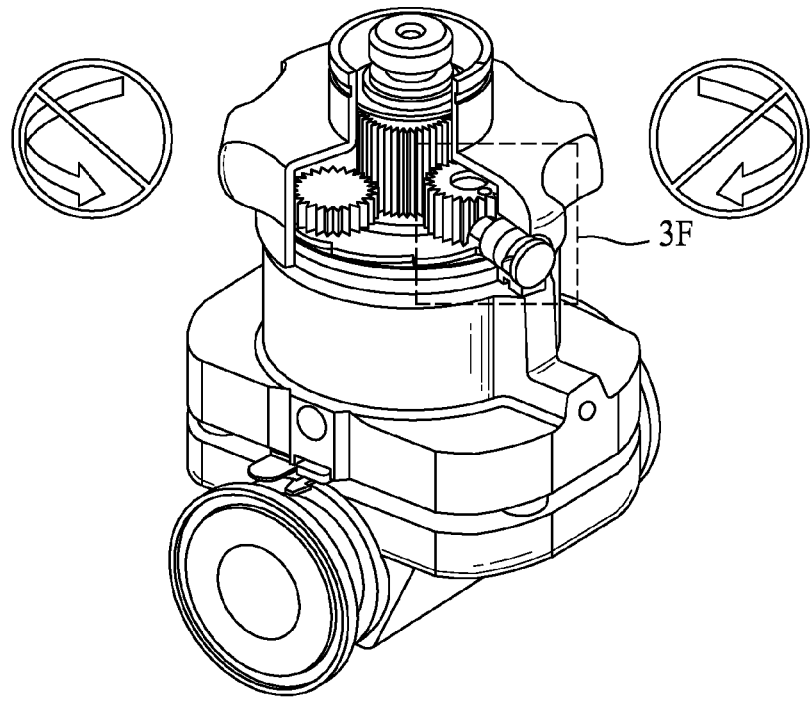
FIG. 3E shows the clocked lock passage gear mechanism in a final locked position with the spring-pin fully engaged in a deep hole or slot in the locking gear, so the spring-pin must be pulled to disassemble; and where
Figure 3F:
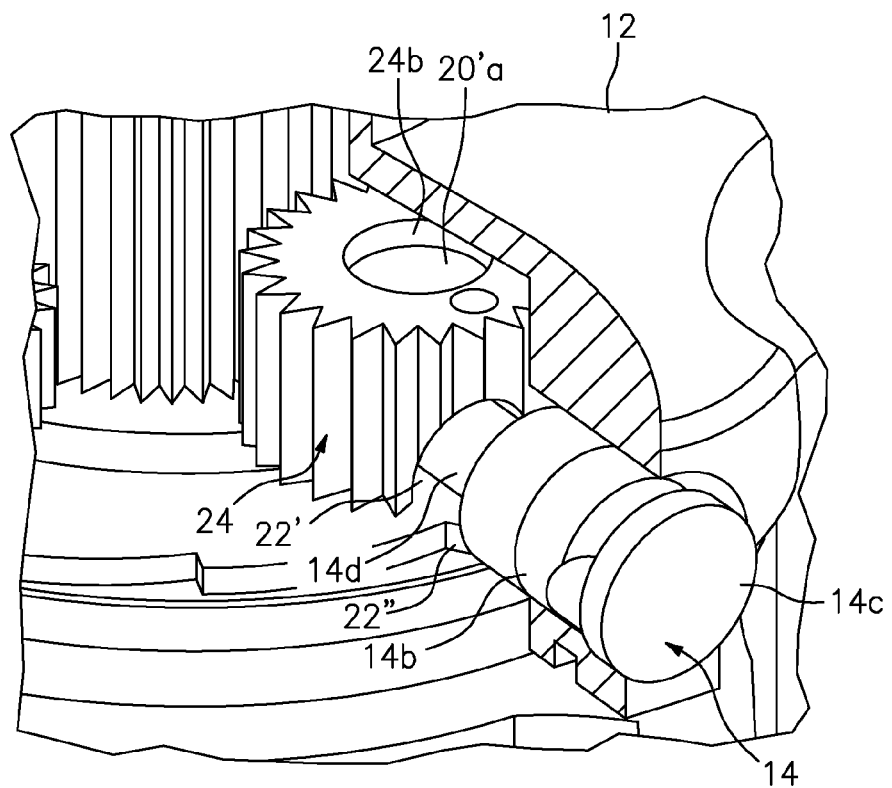
FIG. 3F is an exploded view of part of that shown in FIG. 3E where the spring-pin is fully engaged in the deep hole or slot with a last rotation.

Consistent with that shown in FIG. 3, in operation the spring-pin 14 may be mounted in the cover 12 to rest with half the spring-pin end 14d against some part of the inner circumferential surface 21', e.g., consistent with that shown in FIGS. 3B and 3C. The inner housing component 21' may also include one location L where the spring-pin 14 may fully extend, engaging the combined gear cutout, hole or slot 22', 22" which holds the valve 10' against any further rotation, e.g., consistent with that shown in FIGS. 3E and 3F. What prevents the spring-pin 14 from engaging the hole or slot 22', 22" with each rotation is the threaded surface 24a of the threaded locking gear 24, against which the other half of the spring-pin end 14d may rest, e.g., consistent with that shown in FIGS. 3A and 3D. On the final rotation, the combined gear cutout, hole or slot 22', 22" in the threaded locking gear 24 and/or the circumferential surface 21' lines up with the spring-pin 14 in alignment, e.g., consistent with that shown in FIGS. 3E and 3F. In effect, the combined gear cutout, hole or slot 22', 22" is configured so that the hole or slot 22' in the threaded locking gear 24 allows the spring-pin 14 to fully extend into the inner housing slot 22", thereby locking the rotation, e.g., consistent with that shown in FIGS. 3E and 3F.

The threaded locking gear 24 may be configured with a different number of teeth, (or diameter for a pulley system), than the center gear 28. This is in order for the threaded locking gear 24 to have unique rotational positions with each rotation, calibrating for alignment of the gear cutout 22', inner housing slot 22", and the spring-pin 14 in the final locking position.

Consistent with that set forth above with respect to the embodiment in FIG. 2, although not required, according to some embodiments of the present invention, it is possible to incorporate a ratchet mechanism into the embodiment shown and described in FIG. 3, so that the rotation is locked from reversing at all incremental positions. Consistent with that shown in FIG. 3, the circumferential surface 21' may also be configured with optional ramps and saw teeth generally indicated as 23' configured to prevent loosening of the cover 12 at incremental rotational positions. In effect, the ratcheting mechanism disclosed may be used in conjunction with either technique in FIG. 2 or 3 to prevent loosening at mid-term positions.

RELATED APPLICATIONS

By way of example, the reader is referred to other related patent applications as follows:
patent application Ser. No. 13/595,652, filed 27 Aug. 2012;
patent application Ser. No. 13/599,237, filed 30 Aug. 2012; and
patent application Ser. No. 14/032,822, filed 20 Sep. 2013;
which are all assigned to the assignee of the present invention, disclose the functionality of other parts and components that form part of diaphragm valves, and are all also incorporated by reference in their entirety.

THE SCOPE OF THE INVENTION

It should be understood that, unless stated otherwise herein, any of the features, characteristics, alternatives or modifications described regarding a particular embodiment herein may also be applied, used, or incorporated with any other embodiment described herein. Also, the drawings herein are not drawn to scale.

Although the invention has been described and illustrated with respect to exemplary embodiments thereof, the foregoing and various other additions and omissions may be made therein and thereto without departing from the spirit and scope of the present invention.

What we claim is:

1. Apparatus, including a valve, comprising
a cover configured to rotate, and having a biased-pin mounted therein, a valve housing, and at least one inner housing component
having a circumferential surface configured with a hole or slot formed therein at a predetermined location to receive the biased-pin where the biased-pin is engaged in the hole or slot when the valve is calibrated to be at a final position; and
the cover configured to rotate in relation to the valve housing and the at least one inner housing component and cause an axial translation between the cover and the at least one inner housing component in response to a rotation of the cover, so that the biased-pin bypasses the hole or slot formed in the circumferential surface when the cover and the at least one inner housing component have not yet moved far enough along the axis of translation, and so that the biased-pin engages the hole or slot formed in the circumferential surface when the valve is at the final position so as to stop any further axial and rotational movement.

2. Apparatus according to claim 1, wherein the biased-pin comprises a spring-pin having a combination of a pin and biasing member configured to urge the spring-pin inwardly towards the at least one inner component.

3. Apparatus according to claim 1, wherein the biased-pin is configured to be pulled outwardly to disengage the hole or slot in the at least one inner housing components so as to allow further rotational movement, including forward and reverse rotational movement.

4. Apparatus according to claim 1, wherein the cover is configured to rotate in an axis of rotation that is substantially parallel to the axis of translation.

5. Apparatus, including a valve, comprising
a cover configured with a biased-pin mounted therein, and
at least one inner housing component having a circumferential surface configured with a hole or slot formed therein at a predetermined location to receive the biased-pin where the biased-pin is engaged in the hole or slot when the valve is calibrated to be at a final position; and
the cover configured to rotate and cause an axial translation between the cover and the at least one inner housing component so that the biased-pin bypasses the hole or slot formed in the circumferential surface when the cover has not yet moved far enough along the axis of translation and engages the hole or slot formed in the circumferential surface when the valve is at the final position so as to stop any further axial and rotational movement, wherein the cover is configured to rotate and move along the axis of translation in relation to the at least one inner housing component; the biased-pin comprises a head portion and an end portion; and the head portion is configured to visually indicate when the valve is at the final position, the end portion is fully engaged in hole or slot of the at least one inner housing component, including where the head portion is flush with an outer surface of the cover.

6. Apparatus comprising:

a cover configured with a biased-pin mounted therein, and at least one inner housing component configured with a hole or slot formed at a predetermined location where the biased-pin is at when the valve is calibrated to be at a final position; and the cover configured to rotate and cause an axial translation between the cover and the at least one inner housing component so that the biased-pin engages the hole or slot when the valve is at the final position so as to stop any further axial and rotational movement; wherein the cover is configured to rotate in relation to the at least one inner housing component;

the cover comprises a rotating component configured with threads;

the at least one inner housing component comprises a stem portion configured with corresponding threads; and the threads and the corresponding threads are configured to cooperate and cause the axial translation between the cover and the at least one inner housing component when the cover is rotated.

7. Apparatus comprising:

a cover configured with a biased-pin mounted therein, and at least one inner housing component configured with a hole or slot formed at a predetermined location where the biased-pin is engaged in the hole when the valve is calibrated to be at a final position; and the cover configured to rotate and cause the at least one inner housing component to rotate so that the biased-pin engages the hole or slot when the valve is at the final position so as to stop any further axial and rotational movement;

wherein the at least one inner housing component comprises a locking gear configured with a gear toothed surface having at least part of the hole or slot formed therein so as to form a gear cutout.

8. Apparatus according to claim 7, wherein the at least one inner housing component comprises threaded gears and a central gear and is configured to respond to the rotational movement of the cover and rotate the threaded gears so as to cause the axial translation between the cover and the at least one inner housing component.

9. Apparatus according to claim 8, wherein the locking gear comprises an outer surface configured with associated teeth and is configured with an unthreaded central bore hole;

the at least one inner housing component comprises a pivot portion configured to receive the unthreaded central bore hole of the locking gear; and the associated teeth of the locking gear and corresponding teeth of the central gear are configured to cooperate and cause the locking gear to rotate when the cover is rotated.

10. Apparatus according to claim 8, wherein each threaded gear is configured with gear teeth;

the central gear is configured with corresponding gear teeth; and the gear teeth and the corresponding gear teeth are configured to cooperate and cause the axial translation between the cover and the at least one inner housing component when the cover is rotated.

11. Apparatus according to claim 10, wherein each threaded gear is configured to translate down in response to the rotational movement of the cover.

12. Apparatus according to claim 11, wherein the locking gear is configured to rotate and spin in response to the rotational movement of the cover coinciding with the downward translation of the threaded gears.

13. Apparatus according to claim 7, wherein the at least one inner housing component comprises a circumferential surface; and the biased-pin comprises an end portion and is mounted in the cover so that part of the end portion rests against a corresponding part of some combination of the circumferential surface, the gear toothed surface of the locking gear, or both, until the valve is at the final position and at least part of the end portion drops into the gear cutout.

14. Apparatus according to claim 13, wherein the circumferential surface comprises a corresponding cut or slot configured to receive at least part of the end portion when the valve is at the final position.

15. Apparatus according to claim 7, wherein the locking gear is configured with a different number of teeth or diameter than the center gear in order for the locking gear to have a unique rotational position with each rotation, calibrating for alignment of the gear cutout and spring-pin in the final position.

16. Apparatus, including a valve, comprising:

a cover configured with a biased-pin mounted therein, and at least one inner housing component having a circumferential surface configured with a hole or slot formed therein at a redetermined location to receive the biased-pin where the biased-pin is engaged in the hole or slot when the valve is calibrated to be at a final position; and the cover configured to rotate and cause an axial translation between the cover and the at least one inner housing component so that the biased-pin bypasses the hole or slot formed in the circumferential surface when the cover has not yet moved far enough along the axis of translation and engages the hole or slot formed in the circumferential surface when the valve is at the final position so as to stop any further axial and rotational movement;

wherein the at least one inner housing components comprises a circumferential surface having ratchet teeth configured to cooperate with the biased-pin so that the rotational movement is locked at incremental forward rotational positions and prevented from reverse rotational movement.

* * * * *